(No Model.)
W. R. MAXWELL.
VEHICLE RUNNING GEAR.
No. 508,894. Patented Nov. 14, 1893.
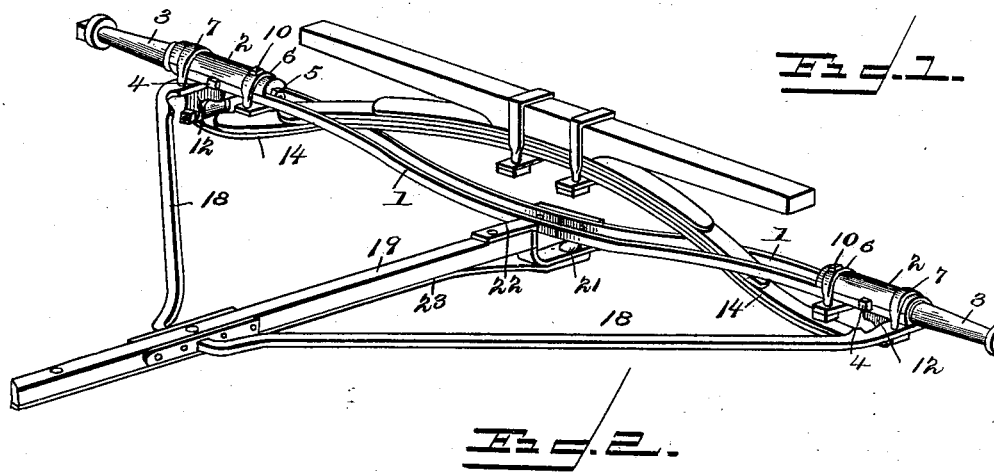
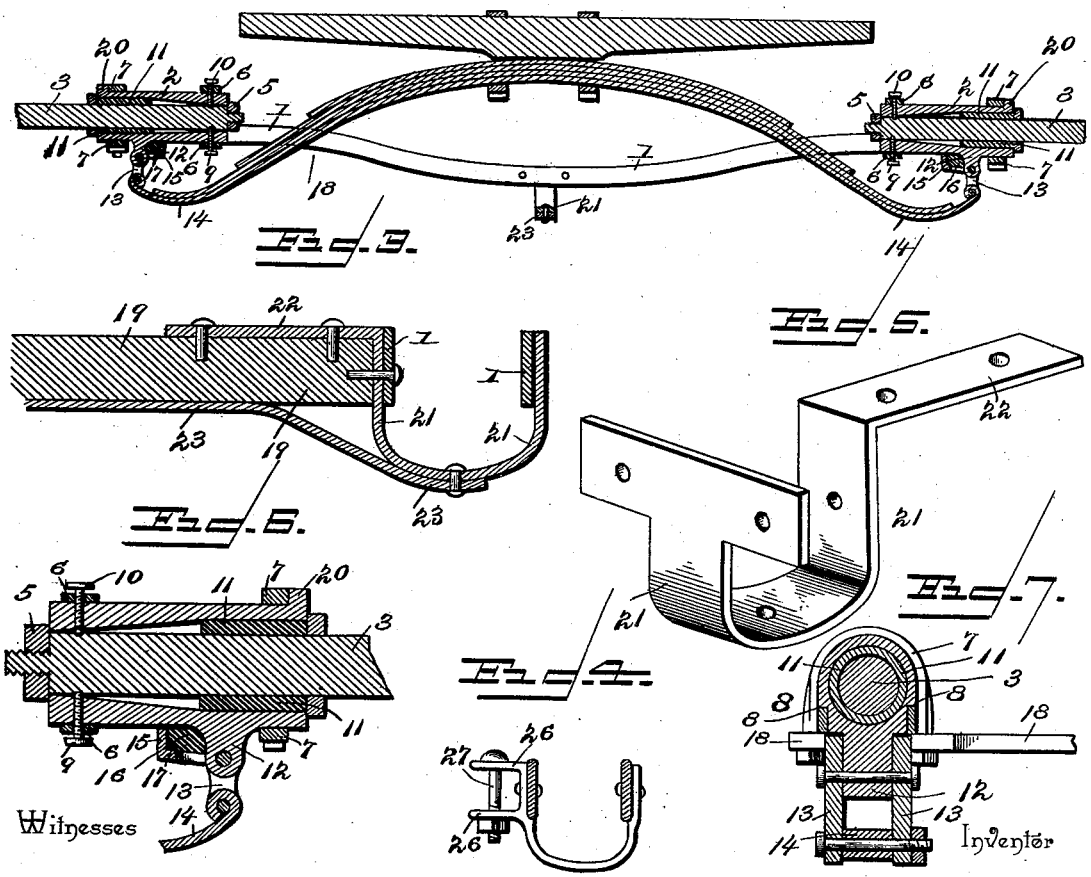

UNITED STATES PATENT OFFICE.

WILLIAM R. MAXWELL, OF WAKEFIELD, PENNSYLVANIA.

VEHICLE RUNNING-GEAR.

SPECIFICATION forming part of Letters Patent No. 508,894, dated November 14, 1893.

Application filed May 27, 1893. Serial No. 475,720. (No model.)

*To all whom it may concern:*

Be it known that I, WILLIAM R. MAXWELL, a citizen of the United States, residing at Wakefield, in the county of Lancaster and State of Pennsylvania, have invented a new and useful Running-Gear, of which the following is a specification.

The invention relates to improvements in running gears.

The object of the present invention is to improve the construction of axles, to enable the axle spindles to be readily removed when worn and new ones supplied without detaching other parts.

A further object of the invention is to prevent in a great measure lateral swinging and swaying, and noise and rattling accompanying such movement.

Another object of the invention is to enable the axle spindles to be readily adjusted with relation to the body of the axle to bring them in proper position.

The invention consists in the construction and novel combination and arrangement of parts hereinafter fully described, illustrated in the accompanying drawings and pointed out in the claims hereto appended.

In the drawings—Figure 1 is a perspective view of the rear portion of a running gear embodying the invention. Fig. 2 is a vertical sectional view taken transversely of the running gear. Fig. 3 is a detail sectional view illustrating the manner of connecting the rear end of the reach to the rear axle. Fig. 4 is a detail sectional view of the front reach coupling. Fig. 5 is a detail perspective view of the rear reach coupling. Fig. 6 is a detail sectional view taken longitudinally of the axle. Fig. 7 is a similar view taken transversely of the axle.

Like numerals of reference indicate corresponding parts in all the figures of the drawings.

1—1 designate similar metal bars, forming the body of an axle and provided with a central dip or depressed portion and having secured between their ends casings 2 for the reception of axle arms 3. The bars 1 which may be of any desirable construction and form, are slightly curved between their ends to form the said depression or dip, and they are secured to the sides of the casings by bolts 4. The arms 3 of the axle are provided with spindles and have their inner portions or shanks arranged within the casings, and secured detachably therein by nuts 5, arranged on the inner ends of the axle arms which are threaded, and bearing against the inner ends of the casings. The casings are further secured to the ends of the bars 1, by inner and outer clips 6 and 7, and are provided at their sides with longitudinal shoulders 8 arranged above the upper edges of the bars 1. The plate of the inner clip 6 has a threaded opening in which is arranged a set screw 9, which passes upward through an opening in the bottom of the casing and engages the axle arm to force the latter upward; and the axle arms are forced downward by set screws 10 mounted in the tops of the inner clips, and passing downward through openings of the casings and engaging the axle arms from above. The openings at the inner ends of the casings are vertically elongated to permit this adjustment; and elastic sleeves or linings 11 are arranged around the axle arms and interposed between the same and the casings to form yielding supports or fulcrums. Each casing is provided with a depending lug 12, and fulcrumed thereon at its angle is a bell-crank shackle 13, which has pivoted or hinged to it an end of a semi-elliptic leaf-spring 14. The bell-crank shackle has one arm arranged approximately horizontal and forming a loop 15 and engaging the adjacent casing. The shackles turn on their fulcrum bolts to relieve the spring, and in order to prevent noise and rattling cushions 16 of rubber or other elastic material are secured in the loops of the shackles. Each loop 15 is provided at its lower edge with an inwardly extending lug 17, which retains the cushion in proper position. The spring 14 extends downward between the bars 1 in the space between the same, and has its ends curved upward and provided with eyes to receive the shackle bolts; and it will be apparent that this construction and arrangement of parts permit a spring of considerable length and strength to be conveniently employed.

The axle is braced by converging side bars 18, which take the place of hounds, and which have their rear ends forming the plates for the outer clips 7. The front ends of the bars 18 are provided with securing plates, which are fastened to opposite sides of a reach 19; and the casings are provided at their outer ends with transverse shoulders 20, located on the upper faces of the casings and forming stops for the outer clips and prevent inward movement of the casings. The reach is secured to the rear axle and a U-shaped coupling 21, which extends below the bars 1 and is secured to the outer sides of the same, and is provided with a forwardly extending plate 22. The plate 22 is secured to the upper face of the reach, and the latter has fastened to its lower face a metal strip or bar 23, the rear end of which is extended beneath and secured to the U-shaped coupling 21. The front axle (not shown) is constructed substantially the same as the rear axle, and the reach is coupled thereto by a U-shaped coupling 25, which is provided with parallel rearwardly extending plates 26 having perforations to receive a coupling bolt 27.

It will be apparent that the axle is capable of permitting its spindle to be readily detached for removal when worn, that new spindles may be readily supplied and accurately adjusted, that the construction of the axle admits of an advantageous arrangement of supporting spring, and that the hinged link connection between the casings and the ends of the spring is devoid of noise and rattling.

Changes in the form, proportion and the minor details of construction may be resorted to without departing from the principle or sacrificing any of the advantages of this invention.

What I claim is—

1. The combination of an axle provided with longitudinal bars spaced apart and forming its body and provided near the extremities of the bars with depending lugs, bell-crank shackles fulcrumed on the lugs, and each having one arm depending from the axle and its other arm arranged to engage the same, a supporting spring arranged in the space between the bars and extending downward below the axle and hingedly connected with the depending arms of the shackles, substantially as described.

2. The combination of an axle having an open body and provided near its ends with depending lugs, bell-crank shackles fulcrumed on the lugs, and each having one arm forming a loop and arranged adjacent to the axle and its other arm depending therefrom, a supporting spring arranged in the space of the axle and extending below the latter and hingedly connected to the depending arms of the shackles, and cushions mounted in the loops of the shackles and engaging the axle to prevent noise and rattling, substantially as described.

3. In an axle, the combination of a casing provided at its top with a transverse shoulder and having at its sides longitudinal shoulders, bars disposed longitudinally of the axle and forming the body thereof and secured to the sides of the casing adjacent to the longitudinal shoulders thereof, and clips passing around the casing and the bars, one of the clips being arranged adjacent to the transverse shoulder, substantially as described.

4. In an axle, the combination of a body, a casing secured thereto, an axle arm arranged within the casing and being of less diameter than the interior of the same, adjusting screws mounted at the top and bottom of the casing and engaging the axle arm from above and below to regulate the position of the same, and an elastic cushion interposed between the axle arm and the casing and arranged within the latter and forming a yielding support or fulcrum, substantially as described.

5. In an axle, the combination of a body having a casing, an axle arm of less diameter than the interior of the casing and arranged therein, set screws arranged at the top and bottom of the casing and engaging the axle arm from above and below to adjust the same, and an elastic lining or sleeve arranged around the axle arm and interposed between the same and the casing and forming a yielding support or fulcrum, substantially as described.

6. In a running gear, the combination of an axle provided with longitudinal bars forming an open body portion, a reach, and an inverted U-shaped coupling secured to the bars and provided with a forwardly extending plate connected to the reach, substantially as described.

7. The combination of an axle provided with longitudinal bars spaced apart and forming an open body portion, a reach, and a U-shaped coupling secured to the sides of the bars and provided with rearwardly projecting plates and having a pivot connecting the reach to the plates, substantially as described.

In testimony that I claim the foregoing as my own I have hereto affixed my signature in the presence of two witnesses.

WILLIAM R. MAXWELL.

Witnesses:
  WM. H. LONG,
  EMMA W. PETERS.